United States Patent
Avila et al.

(10) Patent No.: US 10,182,156 B2
(45) Date of Patent: *Jan. 15, 2019

(54) INSIGHT BASED ROUTING FOR HELP DESK SERVICE

(71) Applicant: Microsoft Technology Licensing, LLC, Redmond, WA (US)

(72) Inventors: Dionicio A. Avila, Issaquah, WA (US); Salman Zafar, Redmond, WA (US); David Wang, Issaquah, WA (US); John King Fredrick Tait, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/469,279

(22) Filed: Mar. 24, 2017

(65) Prior Publication Data

US 2018/0278750 A1    Sep. 27, 2018

(51) Int. Cl.
| | |
|---|---|
| *H04M 3/523* | (2006.01) |
| *H04M 3/51* | (2006.01) |
| *H04L 12/58* | (2006.01) |
| *H04M 3/56* | (2006.01) |

(52) U.S. Cl.
CPC .......... *H04M 3/5233* (2013.01); *H04L 51/02* (2013.01); *H04M 3/5158* (2013.01); *H04M 3/56* (2013.01); *H04M 2203/551* (2013.01)

(58) Field of Classification Search
CPC .. H04M 3/5175; H04M 3/5233; H04M 3/563; H04L 65/1093; H04L 65/403
See application file for complete search history.

(56) References Cited

U.S. PATENT DOCUMENTS

| | | | |
|---|---|---|---|
| 7,734,032 B1 | 6/2010 | Kiefhaber et al. | |
| 8,078,487 B2 | 12/2011 | Li et al. | |
| 8,126,136 B2 * | 2/2012 | Tong | G10L 25/00 379/265.02 |
| 8,582,753 B1 | 11/2013 | Heller et al. | |
| 8,630,886 B2 | 1/2014 | White et al. | |

(Continued)

OTHER PUBLICATIONS

"How to Improve Call Routing", Retrieved From: https://www.callcentrehelper.com/how-to-improve-call-routing-62157.htm, Jan. 23, 2017, 7 Pages.

(Continued)

*Primary Examiner* — Nafiz E Hoque

(57) ABSTRACT

Non-limiting examples of the present disclosure describe insight-based routing that is used to improve processing of a service request through a help desk service. A request for support (e.g. technical support) can be received through a modality of a help desk service. The request is evaluated, where an evaluation of the request comprises analyzing an issue associated with the request as well as user-specific signal data associated with a customer and generating insights. A support agent is matched to the customer based on an evaluation of the request. The support agent is selected from a pool of support agents based on application of a model that analyzes support agent data in correlation with the generated insights. An interaction between the matched support agent and the customer may be initiated through a modality of the help desk service.

20 Claims, 6 Drawing Sheets

(56) References Cited

U.S. PATENT DOCUMENTS

| | | | |
|---|---|---|---|
| 8,718,268 B2 | 5/2014 | Steiner et al. | |
| 8,831,205 B1 | 9/2014 | Wu et al. | |
| 8,848,899 B2 | 9/2014 | Brunet et al. | |
| 8,856,291 B2 | 10/2014 | Bartlett et al. | |
| 9,031,222 B2 * | 5/2015 | Wolfeld | H04M 3/00 |
| | | | 379/265.03 |
| 9,083,804 B2 | 7/2015 | Conway et al. | |
| 9,167,093 B2 | 10/2015 | Geffen et al. | |
| 9,392,117 B2 | 7/2016 | Milstein et al. | |
| 9,472,188 B1 | 10/2016 | Ouimette et al. | |
| 9,571,533 B2 * | 2/2017 | Dinh-Trong | H04L 65/1069 |
| 2002/0161632 A1 | 10/2002 | Hagen et al. | |
| 2007/0025540 A1 | 2/2007 | Travis | |
| 2007/0041567 A1 | 2/2007 | Anisimov et al. | |
| 2010/0325216 A1 | 12/2010 | Singh et al. | |
| 2011/0246260 A1 | 10/2011 | Gilbert et al. | |
| 2013/0073322 A1 | 3/2013 | Virdhagriswaran | |
| 2013/0218782 A1 | 8/2013 | Singal et al. | |
| 2013/0282594 A1 | 10/2013 | Gaedcke et al. | |
| 2015/0189085 A1 | 7/2015 | Riahi et al. | |
| 2015/0269587 A1 | 9/2015 | Swaminathan et al. | |
| 2016/0037126 A1 | 2/2016 | Polyakov et al. | |

OTHER PUBLICATIONS

"Manage all your support conversations in one place", Retrieved From: https://freshdesk.com/multichannel-support, 5 Pages.

"Non Final Office Action Issued in U.S. Appl. No. 15/469,050", dated Nov. 17, 2017, 11 Pages.

"Notice of Allowance Issued in U.S. Appl. No. 15/469,050", dated Mar. 29, 2018, 7 Pages.

* cited by examiner

200

INSIGHT BASED ROUTING FOR HELP DESK SERVICE

BACKGROUND

The task of connecting agents and customer is not a simple one. Typically, agents of a help desk are unfamiliar with the customers they are helping and customers are unfamiliar with the agents who they are receiving assistance from. This can lead to inefficient processing during a help request as well as reduced customer satisfaction. Furthermore, agents may be unaware of a frustration level of a customer. For instance, recent poor customer service experiences may be a catalyst for the customer leaving a help desk service. As such, examples of the present application are directed to the general technical environment related to improving processing efficiency and customer satisfaction when routing communications through a help desk service, among other examples.

SUMMARY

Non-limiting examples of the present disclosure describe insight-based routing that is used to improve processing of a service request through a help desk service. As an example, insights can be generated for help desk cases, where the insights are used to make routing determinations to improve processing of the help desk case. A request for technical support can be received through a modality of a help desk service. The request is evaluated, where an evaluation of the request comprises analyzing an issue associated with the request as well as user-specific signal data associated with a customer. An evaluation of the request may further comprise generating insights based on the analyzed issue and the analyzed user-specific signal data. A support agent is matched to the customer based on an evaluation of the request. The support agent is selected from a pool of support agents based on application of a model that analyzes support agent data in correlation with the generated insights. Examples of support agent data may comprise: customer performance reviews of support agents from the pool of support agents, organizational reviews of the support agents, agent self-evaluations (that include a review of a technical expertise of the support agents and a review of communication skills of the support agents) and availability information for the support agents. An interaction between the matched support agent and the customer may be initiated through a modality of the help desk service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
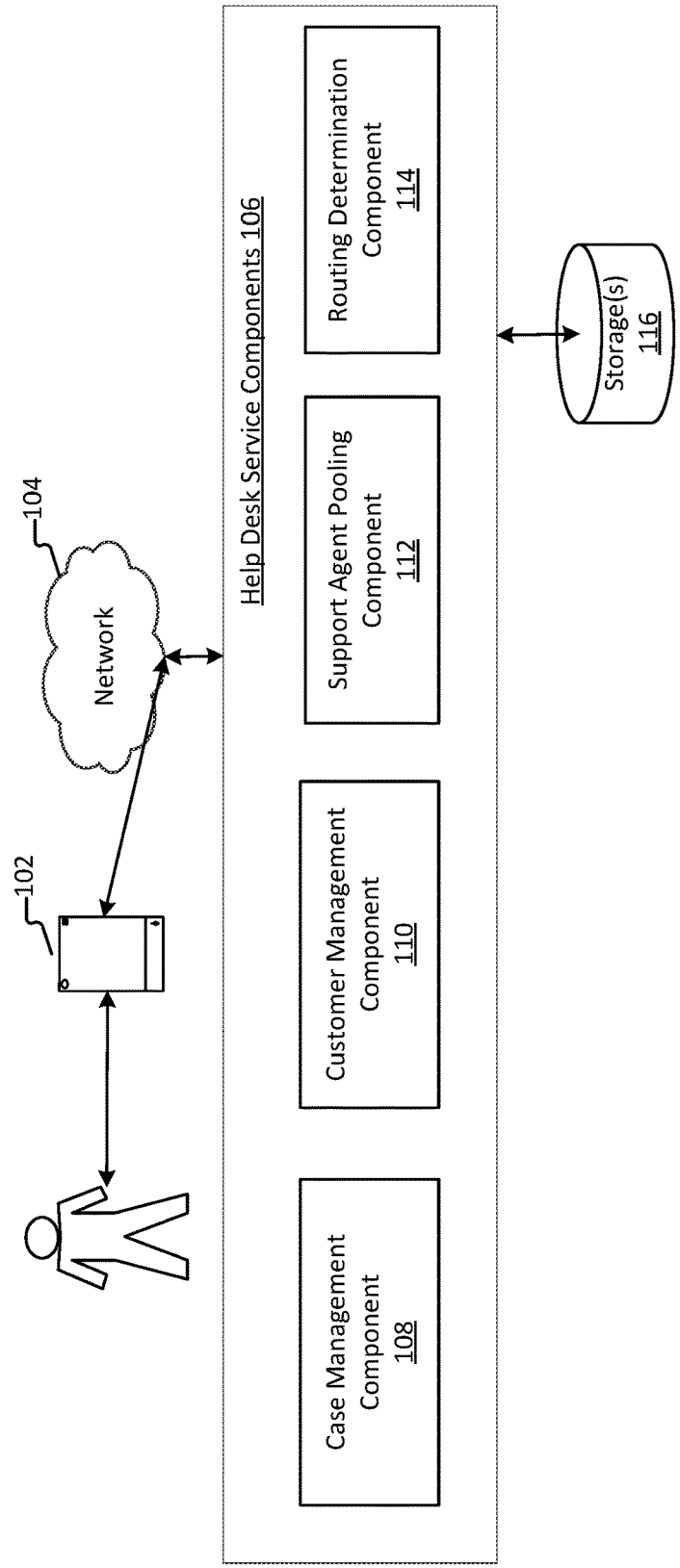
FIG. 1 illustrates an exemplary system implementable on one or more computing devices on which aspects of the present disclosure may be practiced.

Non-limiting examples of the present disclosure describe insight-based routing that is used to improve processing of a service request through a help desk service. Insights can be generated for help desk cases, where the insights are used to make routing determinations to improve processing of the help desk case. In one example, specific insights about a customer can be generated, where the insights about the customer can be utilized to determine how to best to route a customer request. For instance, routing processing of a help desk request may take into consideration whether the customer has recently had a number of poor support experiences and route their request to an agent with good soft skills. Another consideration may be technical proficiency of the customer, where more technically proficient customers may be matched with more experienced agents. Additionally, routing processing might look at how much at risk a customer is of likely leaving the help desk service or a risk of providing a poor feedback rating in order to determine a most appropriate support agent to match with a customer.

Among other examples, user-specific signal data may comprise customer data collected from: a user account and/or help desk profile of a customer, previous interactions of the customer through the help desk service (including telemetry analysis of the previous interactions), reviews of customers by the help desk service (e.g. by support agents of a help desk service) and user data pertaining to the customer that is cross-referenced from other applications/services (e.g. usage data collected from use of a suite of applications that are associated with a platform). In addition to customer data, user-specific signal data may comprise real-time signal data collected from a user/user device from an active communication through a help desk service. Among other types of signal data, user-specific signal data may be collected and analyzed. Insights may be generated based on processing that analyzes the user-specific signal data. Generated insights are used for making routing determinations including selection of a most appropriate support agent (or agents) to assist with a help desk request. An exemplary model may be utilized to execute routing determinations including identifying a match between a customer and support agent based an analysis of the generated insights in correlation with support agent data pertaining to a pool of support agents. Examples of support agent data may comprise but is not limited to: customer performance reviews of support agents from the pool of support agents, organizational reviews of the support agents, agent self-evaluations (that include a review of a technical expertise of the support agents and a review of communication skills of the support agents) and availability information for the support agents.

Moreover, generated insights may be useful in assisting support agents of the help desk in making additional routing determinations related to a help desk case. Examples of routing determinations that may be generated based on application of the routing determination model comprise but are not limited to: matching of a customer to a support agent, dedication of specific support agents to specific customers, determining a next step for resolution of an unresolved case (e.g. automatic resolution, follow-up inquiry, modality to use for a follow-up communication), evaluating when to contact a customer or identification of when a support agent is available based on presence information for customers and support agents and identification of predictive information that may be useful to provide to a support agent based on identification of issue/line of questioning by the customer, among other examples. For instance, evaluation of user-specific signal data may be used to determine whether to dedicate a specific support agent to a customer (e.g. for a predetermined period of time) in order to improve customer satisfaction. In such an example, user-specific signal data may be collected and analyzed in comparison with exemplary support agent data to determine a best match for dedicating a support agent to the customer. In another example, generated insights may be used to determine a next step in resolving an issue of the customer. For instance, evaluation of the user-signal data may yield an insight that a user prefers to receive communications through a specific modality (e.g. chat-based/instant messaging, phone-based, email, web-based platform, etc.) of the help desk service. As another example, an insight may be generated identifying that the customer prefers that an agent of a help desk attempt to automatically resolve an issue before contacting the customer. In such an instance, a matched support agent may be alerted to the fact that the user prefers an attempt at automatic resolution of their issue before receiving subsequent communication.

Accordingly, the present disclosure provides a plurality of technical advantages including but not limited to: generation of real-time insights that are used to enhance processing efficiency and customer satisfaction of a help desk service, extensibility to integrate different applications/services of a distributed network to enhance signal-based processing of a help desk service, more efficient operation of processing devices (e.g., saving computing cycles/computing resources) in resolving help desk issues and improving user interaction with a help desk service, among other examples.

FIG. 1 illustrates an exemplary system 100 implementable on one or more computing devices on which aspects of the present disclosure may be practiced. System 100 may be an exemplary system for management of help desk requests through an exemplary help desk service. Components of system 100 may be hardware components or software implemented on and/or executed by hardware components. In examples, system 100 may include any of hardware components (e.g., ASIC, other devices used to execute/run an OS, and software components (e.g., applications, application programming interfaces, modules, virtual machines, runtime libraries) running on hardware. In one example, an exemplary system 100 may provide an environment for software components to run, obey constraints set for operating, and makes use of resources or facilities of the systems/processing devices, where components may be software (e.g., application, program, module) running on one or more processing devices. For instance, software (e.g., applications, operational instructions, modules) may be executed on a processing device such as a computer, mobile device (e.g., smartphone/phone, tablet) and/or any other type of electronic devices. As an example of a processing device operating environment, refer to operating environments of FIGS. 3-5. One or more components of system 100 may be configured to execute any of the processing operations described in at least method 200 described in the description of FIG. 2. In other examples, the components of systems disclosed herein may be spread across multiple devices. Exemplary system 100 comprises help desk service components 106 that further comprise: a case management component 108, a customer management component 110, a support agent pooling component 112 and a routing determination component 114.

One or more data stores/storages or other memory may be associated with system 100. For example, a component of system 100 may have one or more data storage(s) 116 (described below) associated therewith. Data associated with a component of system 100 may be stored thereon as well as processing operations/instructions executed by a component of system 100. Furthermore, it is presented that application components of system 100 may interface with other application services. Application services may be provided as platform resources referenced in the foregoing. Application services may be any resource that may extend functionality of one or more components of system 100. Application services may include but are not limited to: personal intelligent assistant services, word processing services, spreadsheet services, presentation program services, illustration/diagramming services, social networking services, call/video communication services, language understanding services, speech recognition services, optical character recognition services, facial recognition services, web search services, e-mail applications, calendars, device management services, address book services, informational services, line-of-business (LOB) management services, customer relationship management (CRM) services, debugging services, accounting services, payroll services and services and/or websites that are hosted or controlled by third parties, among other examples. Application services may further include other websites and/or applications hosted by third parties such as social media websites; photo sharing websites; video and music streaming websites; search engine websites; sports, news or entertainment websites, and the like. Application services may further provide analytics, data compilation and/or storage service, etc., in association with components of system 100.

System 100 may comprise one or more storage(s) 116 that may store data associated with operation of one or more components of system 100. In examples, storage(s) 116 may interface with other components of system 100. Data associated with any component of system 100 may be stored in storage(s) 116, where components may be connected to storage(s) 116 over a distributed network including cloud computing platforms and infrastructure services. Exemplary storage(s) 116 may be any of a first-party source, a second-party source, and a third-party source. Storage(s) 116 are any physical or virtual memory space. Storage(s) 116 may store any data for processing operations performed by components of system 100, retained data from processing operations, stored programs, code or application programming interfaces (APIs), training data, links to resources internal and external to system 100 and knowledge data among other examples. For example, storage(s) 116 may be utilized to manage data for processing and operation of an exemplary routing determination model that is used for executing routing determinations for management of help desk cases. An exemplary routing determination model is subsequently described in at least the description of the routing determination component 114 (of FIG. 1). Furthermore, in examples, components of system 100 may utilize knowledge data in processing by components of system 100. Knowledge may be used by one or more components of system 100 to improve processing of any of the help desk service components 106 where knowledge data can be obtained from resources internal or external to system 100. In examples, knowledge data may be maintained in storage(s) 116 or retrieved from one or more resources external to system 100 by knowledge fetch operation.

In FIG. 1, processing device 102 may be any device comprising at least one processor and at least one memory/storage. Examples of processing device 102 may include but are not limited to: processing devices such as desktop computers, servers, phones, tablets, phablets, slates, laptops, watches, and any other collection of electrical components such as devices having one or more processors or circuits. In one example processing device 102 may be a device of a user that is executing applications/services including a help desk service. During execution of the help desk service, processing device 102 may communicate with the help desk service components 106 via a network 104. In one aspect, network 104 is a distributed computing network, such as the Internet. Processing device 102 may be a device as described in the description of FIGS. 3-5. In some examples, processing device 102 may comprise multiple connected devices. Processing device 102 is an example of a user computing device. The processing device 102 may execute processing operations that include an ability to access an application/service through a user account. In one example, processing device 102 may connect an authenticated user to an exemplary application/service that stores user data for one or more users of an exemplary help desk service.

An exemplary storage application/service may provide a user of processing device 102 with access to data stored in an exemplary data center. In one example, processing device 102 may be connected with storage(s) 116 via a distributed network, which may provide users with access to user data. One or more tenant resources (e.g. Tenant Resource A, Tenant Resource B, Tenant Resource C, etc.) may be associated with processing device 102. A tenant resource may be a user account associated with a processing device and/or distributed network service. Data associated with a tenant resource may be stored on storage(s) 116, where a tenant account can be utilized to access stored data by processing device 102 and/or other processing devices. As identified above, storage(s) 116 may further be configured to store data associated with the help desk service components 106. Help desk service components 106 are components of an exemplary help desk service, where the help desk service components 106 are configured to execute processing operations to enable management and routing of help desk requests of a help desk service. An exemplary help desk service may comprise additional components, which are known to one skilled in the art.

An exemplary help desk service is an application that provides service and support for products/services. In one example, the help desk service provides technical support for suite of applications/services that are accessed by processing device 102. A help desk service may be configured to further provide support in other areas such as billing issues and business policies, among other examples. In operation, the help desk service is configured to provide a plurality of modalities that enable communication between users/customers and support agents. For instance, the help desk service may be configured to enable a customer to connect with a support agent via: chat/instant messaging, phone/video conferencing, email and communications through a web-based platform and/or mobile application, among other examples. In one example, an exemplary help desk service may comprise a web portal that customers and support agents can log into for the management of issues/cases, thereby fostering transparency related to interactions between users/customers and support agents. While a customer may interact with a support agent through one type of modality (e.g. chat service or phone service) case details related to created cases may be maintained and updated in the web portal.

The help desk service components 106 are executed by one or more computing devices. An exemplary computing device may comprise one or more processors and memory, among other components. Examples of computing devices are provided in the description of at least FIGS. 3-5. The help desk service components 106 comprise: a case management component 108, a customer management component 110, a support agent pooling component 112 and a routing determination component 114.

The case management component 108 is a component configured for managing data associated with created help desk cases. For instance, the case management component 108 is configured to manage, for help desk cases: creation, update (in real-time), resolution (e.g. closing of help desk cases and notifications), access to case details data and management of follow-up inquiries (e.g. with customers). As an example, the case management component 108 may be configured to enable creation of a new case for tracking of a customer issue with an application/service. A help desk case can be created by a customer or a support agent (on behalf of a user). For instance, the case management component 108 is configured to enable a customer to select, through any of the web-based modalities of the help desk service, user interface features for help desk case creation. In another example, a customer can initiate help desk case creation through a phone/web based modality.

Further, the case management component 108 is configured to manage case details associated with created help desk cases. Case details data may comprise but are not limited to: an assigned case/ticket number, state of the case (e.g. resolution indication, event data, timeline, commentary, task list/action items), support agent data pertaining to a pool of support agents provided by the help desk service, customer data (e.g. encompassing some user-specific signal data utilized for matching and routing processing) and indications of presence data through modalities of the help desk service for customer or assigned support agents, among other examples. Case details data is used to provide a status of ongoing cases, where other components of the help desk service such as the routing determination component 114 are configured to interface with the case management component 108 for management (and update of) case detail data. For instance, the routing determination component 114 is configured to access case detail data, which can be used by the routing determination model to generate routing determinations for routing management of help desk cases/requests. In one example, case detail data may be analyzed by the routing determination model and factor into assignment of a support agent to a specific help desk case.

Moreover, the case management component 108 is configured to management transmission/output of case details data when a help desk case is being accessed through a modality of the help desk service. The case management component 108 is configured to interface with the customer management component 110, for example, for managing association of customer data with a specific help desk case. In one instance, a user profile of a customer is included in the case details data so that information associated with a specific customer is available in real-time when a help desk case is being viewed through a modality of the help desk service. Further examples of customer data are provided in the subsequent description of the customer management component 110. Additionally, the case management component 108 is configured to interface with the support agent pooling component 112, for example, to manage an association of one or more support agents to a specific help desk case. Support agent data (managed by the support agent pooling component 112) may be shared with the case management component 108. In one example, a profile of a support agent is associated with case details data so that information associated with a specific agent is available in real-time when a help desk case is being viewed through a modality of the help desk service. Further examples of support agent data are provided in the subsequent description of the support agent pooling component 112.

The case management component 108 may further be configured to manage a state associated with a help desk case. In one example, listings may be maintained for help desk cases, which may be used to identify unresolved help desk cases, among other examples. The case management component 108 may be configured to employ processing operations for managing states associated with help desk case listings, for example, where telemetry analysis may be executed and reported. In one example, the case management component 108 is configured to interface with the routing determination component 114 for identification of unresolved cases and management of follow-up inquiries.

The customer management component 110 is a component configured for managing information associated with customers of the help desk service. Customer data may comprise but is not limited to: customer login data, user presence information (e.g. indicating availability of the customer), profile information for a customer, reviews of a customer (e.g. by support agents), usage data pertaining to use of the help desk service and data (including usage data for the customer) from other related applications/services, among other examples. Customer data, along with real-time signal data pertaining to the user that is collected during a communication, may be collectively referred to as user-specific signal data. User-specific signal data may be utilized for the generation of insights about a customer, for example, which can be used to match a support agent (to the customer) as well as make additional determinations regarding routing of help desk requests. As an example, a user account of a customer may be associated with suite of applications/services, where usage data from other applications/services can provided to the help desk service components 106 (e.g. through an API) for the generation of insights about the customer. Generated insights can then be modeled to generate routing determinations for improving processing of the help desk service. For instance, usage data from the help desk service and/or one or more other applications/services can be collected, aggregated (at a customer level) and analyzed, where telemetric analysis can be executed and results provided to the routing determination model for insight generation/routing determination. As identified above, the customer management component 110 interfaces with the case management component 108 for management of customer data with case details data of a specific help desk case. As referenced above, the customer management component 110 further interfaces with the routing determination component 114 to provide customer data for use in generation insights (about the customer) as well as routing determinations for routing of help desk cases.

The support agent pooling component 112 is a component configured to manage support agent data for a pool of support agents that are associated with the help desk service. Support agents may comprise agents that are exclusively affiliated with the help desk service and/or agents of third-party services that are associated with the help desk service. In some examples, support agents may be bots (e.g. chat bots) or software agents that are programmed to assist customers. Bot agents may be trained and build off learning models that can adaptively adjust to customers based receipt of generated insights and/or other routing determinations made by the routing determination model. Support agent data is information pertaining to a specific support agent. In one example, the support agent data may be managed (and continuously updated), where the support agent data is utilized in a determination that identifies a best possible match for assigning a support agent to a case of a specific customer. Examples of support agent data may comprise but are not limited to: customer performance reviews of support agents, organizational reviews of the support agents, agent self-evaluations that include a review of a technical expertise of the support agents and a review of communication skills of the support agents and availability information for the support agents, among other examples. An exemplary routing determination model (executed by the routing determination component 114) may be configured to utilize any of the above identified support agent data in generating a matching determination for assigning a specific support agent to a customer (and help desk case). Support agent data may further be used to in generating other determinations such as how and when to initiate a follow-up inquiry into an unresolved case.

Customer performance reviews for support agents may be managed by the support agent pooling component 112. As an example, customer performance reviews may be any information associated reviews received for specific support agents from customers of the help desk service. For instance, data associated with customer performance reviews may be collected, parsed, aggregated and analyzed (in total and/or to specific aspects) to evaluate a support agent. Examples of areas of review for a support agent that be evaluated by the routing determination model comprise but are not limited to a review of: overall satisfaction rating with the service provided, technical expertise of the support agent, communication/soft skills of the support agent, efficiency in case management and ratings on notifications/keeping the customer informed including follow-up inquiries if a case remains unresolved, among other examples.

Organization reviews for support agents may also be managed by the support agent pooling component 112. Organization reviews of the support agents may be an analysis of support agents from the perspective of the help desk service. In one example, organizational reviews of the support agents comprise peer reviews, from other support agents of the pool of support agents, that have the same (or different) technical expertise as the support agent. In further examples, organization reviews of the support agents comprise telemetric analysis of services provided by the support agents. Telemetric analysis of support agents may be evaluated for a specific time period (e.g. recent performance of the support agent) and/or in aggregate over a career of the support agent, where both types of data may be useful in evaluating compatibility of a support agent for a specific customer and case. Data on performance of support agents may be obtained through training, monitoring of interactions with customers and statistical analysis of help desk cases (aggregated at different levels) including an analysis of case resolution rates and experience/career progression, among other examples.

Further, self evaluation of support agents may also be managed by the support agent pooling component 112. Support agent data may comprise agent self-evaluations. The help desk service may require that its support agents provide information evaluating themselves. In some instances, an agent self evaluation relates to creation of an initial profile, where a support agent provides information about itself. In further examples, self evaluation data may be updated periodically by the agent (e.g. in reviews or as often as required by the help desk service). Self evaluation data for support agents may comprise data indicating a review of a technical expertise (e.g. primary and secondary areas of expertise) of the support agent, a review of problem solving ability of the support agent and a review of communication skills/soft skills of the support agent. While other areas of review may also be collected, an honest assessment by the agent for: technical expertise and review of problem solving and communication skills may be factors that can help influence a matching determination. For example, if generated insights indicate that a customer has a high frustration level and a string of recent bad help desk experiences, the routing determination model can be configured to weight factors such as problem solving skills and communication skills of the agent as being more important when matching a customer and a support agent. In such an example, problem solving and communication skills of the pool of support agents can be evaluated from a number of different perspectives (e.g. customer evaluation, organizational evaluation and agent self-evaluation) to determine the best possible match for a specific situation.

Availability information for support agents may also be managed by the support agent pooling component 112. Availability information may pertain to information indicating: whether an agent is logged into a help desk service; one or more modalities of the help desk service that a user is actively using; and whether an agent is engaged (or scheduled to be engaged) in an interaction with a customer. Such information may be evaluated by the routing determination component 114 to generate routing determinations including a matching of a support agent to a specific customer/help desk case.

The routing determination component 114 is a component configured for management of routing determinations for help desk cases. To make the best possible routing determinations, the routing determination component 114 is configured to receive signal data (e.g. case specific signal data, user-specific signal data, signal data from an ongoing communication, support agent-specific signal data, etc.) and generate insights from an evaluation of the signal data. The routing determination component 114 generates insights related to a specific help desk case, specific customer and/or specific support agent (e.g. that is engaged in an active communication with a customer). Feature selection processing may be executed for the generated insights, where the insights may be modeled to make routing determinations for a help desk case. In an alternative example, signal data may be collected and evaluated separately from the routing determination model, where generated insights may be transmitted to the routing determination model for subsequent processing. In that example, an API or another model, among other examples, may be utilized to collect, parse and analyze signal data for insight generation.

The generated insights may be evaluated by an exemplary routing determination model to make routing determinations for a specific help desk case. An exemplary routing determination model (employed by the routing determination component 114) may be adaptive and update over time based on new available data and training. In some examples, the routing determination component 114 may be configured to employ multiple different models that each may be configured for processing different routing determinations. Examples of routing determinations that may be generated based on application of the routing determination model (and/or additional models) comprise but are not limited to: matching of a customer to a support agent, dedication of specific support agents to specific customers, determining a next step for resolution of an unresolved case (e.g. automatic resolution, follow-up inquiry, modality to use for a follow-up communication), evaluating when to contact a customer or identification of when a support agent is available based on presence information for customers and support agents and identification of predictive information that may be useful to provide to a support agent based on identification of issue/line of questioning by the customer, among other examples.

Generated insights may comprise insights generated based on evaluation of static data (e.g. information retrieved about a case, customer data such as profile data, support agent profiles, etc.) as well as insights generated from analysis of real-time signal data during a communication/interaction with a customer and/or support agent. Examples of insights generated by the routing determination component 114 include insights regarding a technical expertise of a customer and a support agent. In one example, a matching of a support agent to a customer may be based in part on a matching of technical expertise of the customer and a support agent. Other examples of insights that may be considered in routing determinations include but are not limited to: a state of a help desk case, a level of customer frustration (of a customer and/or a support agent), an indication of recent poor customer experiences for a customer, a rating indicating likelihood that a customer may leave the help desk service, language and communication skills of a customer, a classification of inquiries by the customer (e.g. whether questions are out-of-scope for specific applications/services or whether questions are related to business policy, billing, etc.), whether questions exceed an expertise of a support agent and modality/presence information (including ability for a customer to receive multimodal communications through different applications/services), among other examples. As an example, insights may be generated from evaluation of real-time signal data based on any of: voice analytics analyzing speech (e.g. lexical and prosodic features), analytics for text/handwritten input, optical character recognition analytics, emotion recognition and facial recognition, among other examples. The help desk service may interface with one or more other applications services (described in the foregoing) to extend functionality to enable real-time signal processing to occur.

Furthermore, processing by the routing determination model is configured to account for a state of a help desk case. For instance, the routing determination model may evaluate whether a help desk case is newly initiated, involved in an active communication, unresolved after one or more interactions with support agents, etc. Generation of insights may vary based on the stage at which the help desk case is in. For example, if a help desk case is at an initial stage where no support agent has yet to be assigned, insights may be generated based on available case details and available customer data. In some instances, customer data may include insights generated based on real-time signal data such as voice depending on a modality that a user is initiating a help desk request from. If a customer is engaged in an active communication with a support agent, real-time signal data may be analyzed for the communication. Insights related to a state of a help desk case may also be used in making additional routing determinations (e.g. next actions for a case, whether to dedicate a support agent to a case, a best approach for a follow-up inquiry, etc.).

The routing determination component 114 is configured to match the customer with a support agent. In one example, a support agent is newly assigned to a help desk case when a help desk case is initiated. Matching of a support agent to a customer may be automatically initiated based receipt of (or creation of) a help desk case. In another example, a support agent may be added to an existing help desk case, for example, where a support agent is patched into a communication between a customer and a support agent to provide additional assistance. One such example is the case where a generated insight indicates that a support agent is in over their head and can benefit from additional support. For instance, a matching of a support agent to a customer may be automatically initiated during a help desk communication based on identification of a generated insight indicating that the support agent is in over their head. In another example, matching of a support agent to a customer/help desk case may be initiated based on a user interface selection for assistance that is selected through a modality of the help desk service. For instance, a modality of the help desk service may be configured to provide user interface features for a customer and/or support agent to indicate that assistance is requested. In one example, an insight for selection of a user interface feature for assistance may be evaluated in the context of other insights (e.g. real-time insight that agent is struggling to find an answer) before a matching processing is initiated. Alternatively, evaluation of real-time signal data may identify that a user or support agent has provided keywords indicating that additional assistance should be incorporated into an interaction.

In at least one example, a support agent involved in an interaction for help desk assistance may be provided with data for another matched agent who can be added to the interaction. This may enable the agent to smoothly transition the interaction to introduce a newly added support agent. In an alternative example, the routing determination component 114 is configured to provide a support agent with a listing of matched support agents. This may enable a support agent to select a support agent from a list of best candidates support agents as identified by a routing determination model.

In any example, the routing determination component 114 is configured to select a support agent from a pool of support agents based on application of the routing determination model that analyzes support agent data in correlation with the generated insights. Examples of support agent data may comprise: customer performance reviews of support agents from the pool of support agents, organizational reviews of the support agents, agent self-evaluations that include a review of a technical expertise of the support agents and a review of communication skills of the support agents and availability information for the support agents. Processing for output of N best matches are known to one skilled in the art, where learning models are configured to generate an output from any number of inputs. In one example, the exemplary routing determination model may be configured to employ a ranker to select one or more best matches. In some example, different weighting may be assigned to different insights, which may impact the matching processing (for selecting a most appropriate support agent or other type of routing determination processing). For instance, technical expertise and communication skills for support agents may be weighted more heavily than other factors for matching based on an evaluation of the generated insights. Similar processing may be employed for mapping of generated insights to execute other routing determinations such as: dedicating a specific support agents to a specific customer, determining a next step for resolution of an unresolved case (e.g. automatic resolution, follow-up inquiry, modality to use for a follow-up communication), evaluating when to contact a customer or identification of when a support agent is available based on presence information for customers and support agents and identification of predictive information that may be useful to provide to a support agent based on identification of issue/line of questioning by the customer, among other examples.

The routing determination component 114 is configured to output a routing determination in accordance with a state of the help desk case. For instance, in an example where a help desk request is being created, an interaction between the matched support agent and the customer may be initiated through a modality of the help desk service. In an example, where a first support agent is involved in a communication with a customer, a second support agent (e.g. matched support agent) may be added/patched into the communication. In examples where a routing determination relates to generation of a follow-up inquiry for an unresolved help desk case, the routing determination component 114 may automatically provide a notification to a support agent to follow-up with a customer. For instance, an agent may be automatically assigned to follow-up with a customer for an unresolved request. In another instance where an agent is assigned to a help desk case, an agent may automatically receive a reminder to follow-up with a customer. In further examples, a follow-up inquiry may automatically be transmitted based to a customer and/or support agent. For instance, the routing determination model may identify that a follow-up is needed for a help desk case, evaluate presence information for the customer and/or support agent and transmit a communication. This processing may be useful in keeping resolution of the help desk case as a priority.

Figure 2:
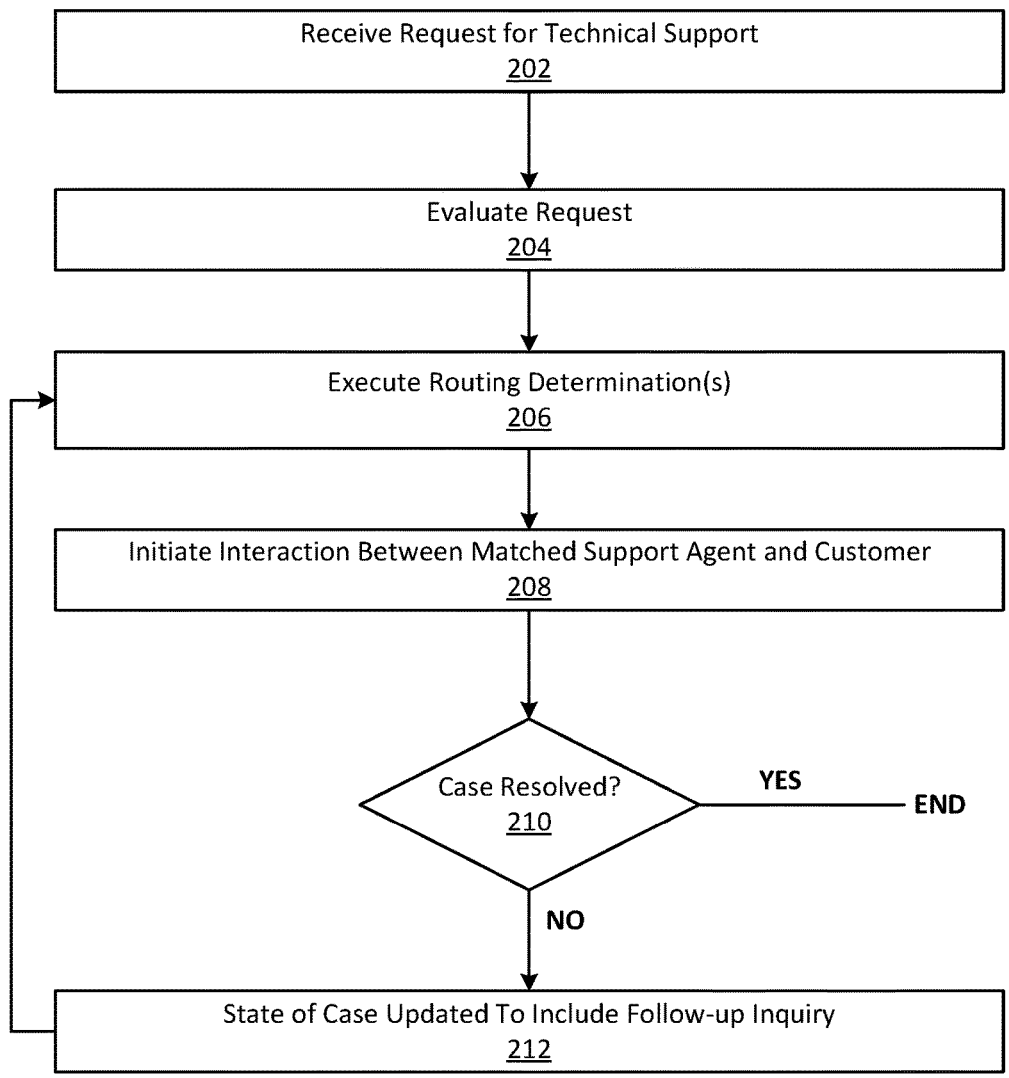
FIG. 2 is an exemplary method related to routing of help desk requests with which aspects of the present disclosure may be practiced.

FIG. 2 is an exemplary method 200 related to routing of help desk requests with which aspects of the present disclosure may be practiced. Method 200 relates to insight-based routing that is used to improve processing of a help desk service when processing service requests. As an example, insights can be generated for help desk cases, where the insights are used to make routing determinations to improve processing of the help desk case. As an example, method 200 may be executed by an exemplary processing device and/or system such as those shown in FIGS. 3-5. In examples, method 200 may execute on a device comprising at least one processor configured to store and execute operations, programs or instructions. Operations performed in method 200 may correspond to operations executed by a system and/or service that execute computer programs, application programming interfaces (APIs), neural networks or machine-learning processing, among other examples. As an example, processing operations executed in method 200 may be performed by one or more hardware components. In another example, processing operations executed in method 200 may be performed by one or more software components. In some examples, processing operations described in method 200 may be executed by one or more applications/services associated with a web service that has access to a plurality of application/services, devices, knowledge resources, etc. Processing operations described in method 200 may be implemented by one or more components connected over a distributed network, for example, as described in system 100 (of FIG. 1).

Method 200 begins at processing operation 202, where a request for technical support is received through a modality of a help desk service. An exemplary help service and examples of modalities of a help service have been provided in the foregoing description including the description of system 100 (FIG. 1). In one example, a request for technical support may be received (processing operation 202) from a customer of a help desk service. For instance, a customer may initiate a request to open a new help desk case to resolve a technical support issue related to an application/service and/or processing device.

Flow may proceed to processing operation 204, where the request is evaluated. As an example, a request may be evaluated by one or more components of the help desk service such as the routing determination component 114 (described in the description of FIG. 1). Evaluation (processing operation 204) of the request may comprise: analyzing an issue associated with the request as well as analyzing user-specific signal data associated with a customer. An evaluation (processing operation 204) of the request may further comprise generating insights based on the analyzed issue and the analyzed user-specific signal data. Other signal data associated with the request may also be analyzed including signal data related to: case details data, support agent data as well as signal data related to an active communication (e.g. between a customer and a support agent). Further description related to generation of exemplary insights is provided in the description of system 100 (FIG. 1).

At processing operation 206, a routing determination is executed. Examples of routing determinations are provided in the foregoing description and may comprise: matching of a customer to a support agent, dedication of specific support agents to specific customers, determining a next step for resolution of an unresolved case (e.g. automatic resolution, follow-up inquiry, modality to use for a follow-up communication), evaluating when to contact a customer or identification of when a support agent is available based on presence information for customers and support agents and identification of predictive information that may be useful to provide to a support agent based on identification of issue/line of questioning by the customer, among other examples. In one example, processing operation 206 may comprise matching a support agent with the customer based on an evaluation of the request. For instance, a matching of a support agent to a customer/help desk case may occur at initial stages of creation of a help desk case. After a help desk case is created, matching of a support agent to a help desk case can also occur including during an active communication for the help desk case. During a matching processing, a support agent is selected from a pool of support agents based on application of a model that analyzes support agent data in correlation with the generated insights. An example of a model used for matching a customer with a support agent is a routing determination model (as described in the description of system 100). Examples of support agent data may comprise: customer performance reviews of support agents from the pool of support agents, organizational reviews of the support agents, agent self-evaluations (that include a review of a technical expertise of the support agents and a review of communication skills of the support agents) and availability information for the support agents. An exemplary support agent may be a live person or software agent (e.g. a chatbot).

Flow may proceed to processing operation 208, where an interaction between the matched support agent and the customer may be initiated. As an example, an interaction may be initiated (processing operation 208) through a modality of the help desk service. An interaction may be a communication regarding an issue that is the basis of the request for help desk assistance, where an initial communication between a customer and an assigned support agent may be launched. In an alternative example, an initial interaction may be an indication of an automatic resolution of the issue by the matched support agent. For instance, a customer may submit a request for resolution of an issue where a support agent may be assigned to the case and resolve the issue for the customer without requiring further input from the customer. In such examples, subsequent communication between the customer and support agent may also occur. In another example, processing operation 208 may comprise patching the matched support agent into an ongoing call communication involving the customer and another support agent of the pool of support agents.

At decision operation 210, it is determined whether the help desk case is resolved. For example, an interaction (initiated in processing operation 208) may have been sufficient to resolve an issue, resulting in a closure of a help desk case. In examples, additional processing operations such as updating a state or status of a case may occur to indicate that the issue has been resolved and the case is closed. Ultimately, if the case is determined to be resolved, flow of decision operation 210 branches YES and processing ends.

If the case is determined to be unresolved, flow of decision operation 210 branches NO and proceeds to processing operation 212. At processing operation 212, a state of a case may be updated to include an indication of a follow-up inquiry. Follow-up inquiries may be set to occur any time after a help desk case is created. For example, a support agent (or customer) may set a follow-up inquiry to revisit the state of an unresolved help desk case. A follow-up inquiry may be transmitted based on setup (processing operation 212) of the follow-up inquiry. Subsequent evaluation of a state of a case (and execution of subsequent routing determinations) may occur at a later point in time.

Figure 3:
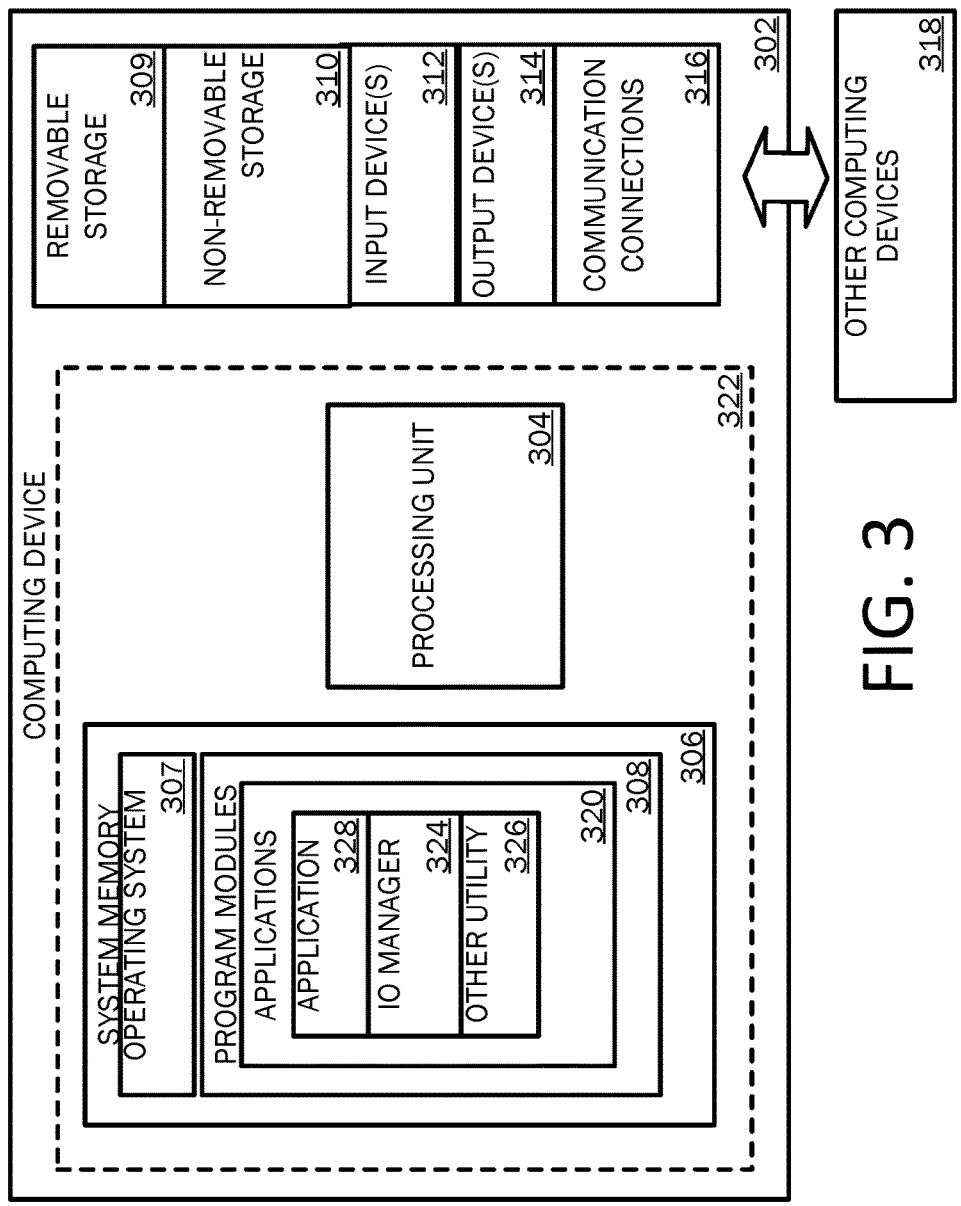
FIG. 3 is a block diagram illustrating an example of a computing device with which aspects of the present disclosure may be practiced.
Figure 4A:
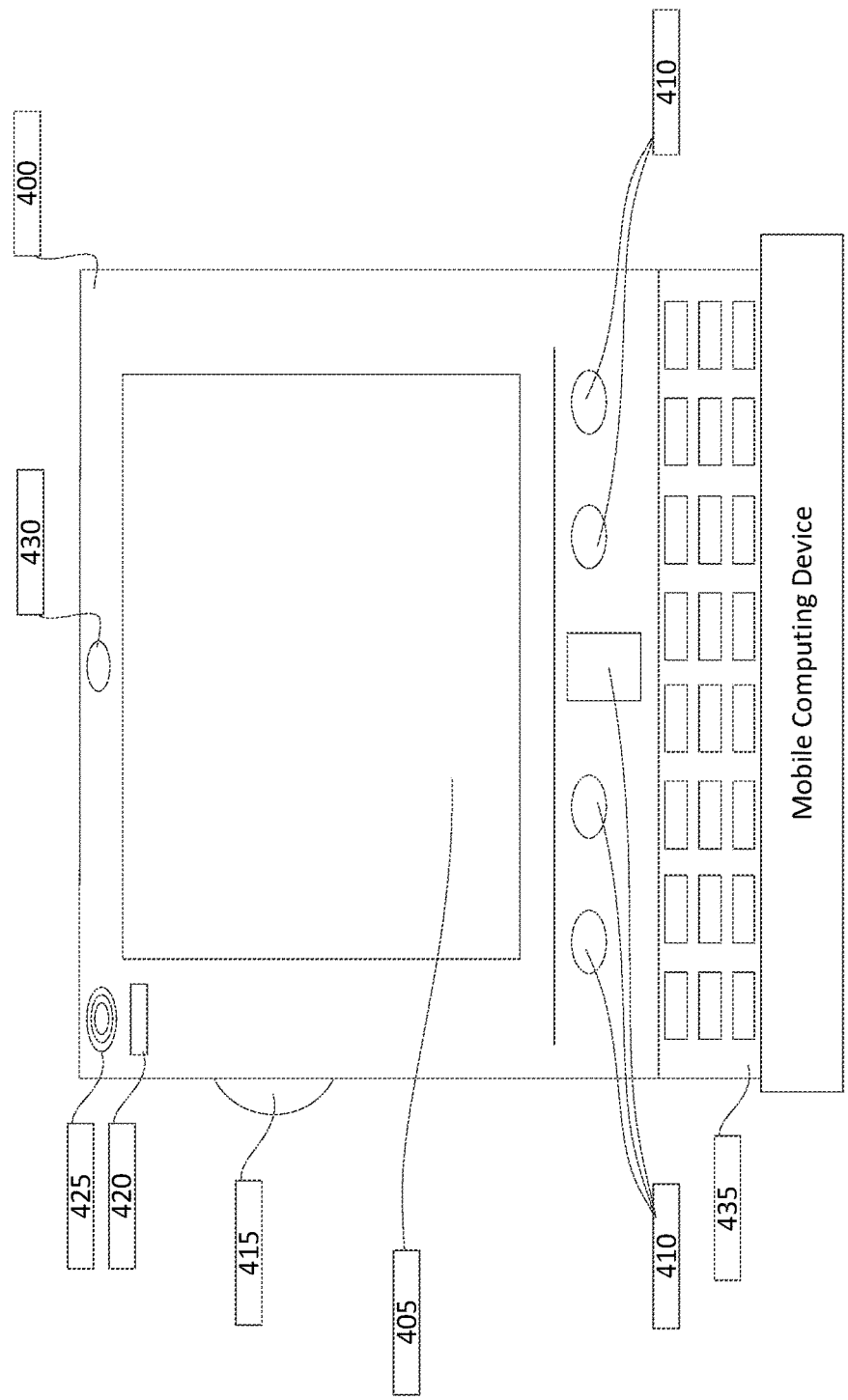
FIGS. 4A and 4B are simplified block diagrams of a mobile computing device with which aspects of the present disclosure may be practiced.
Figure 4B:
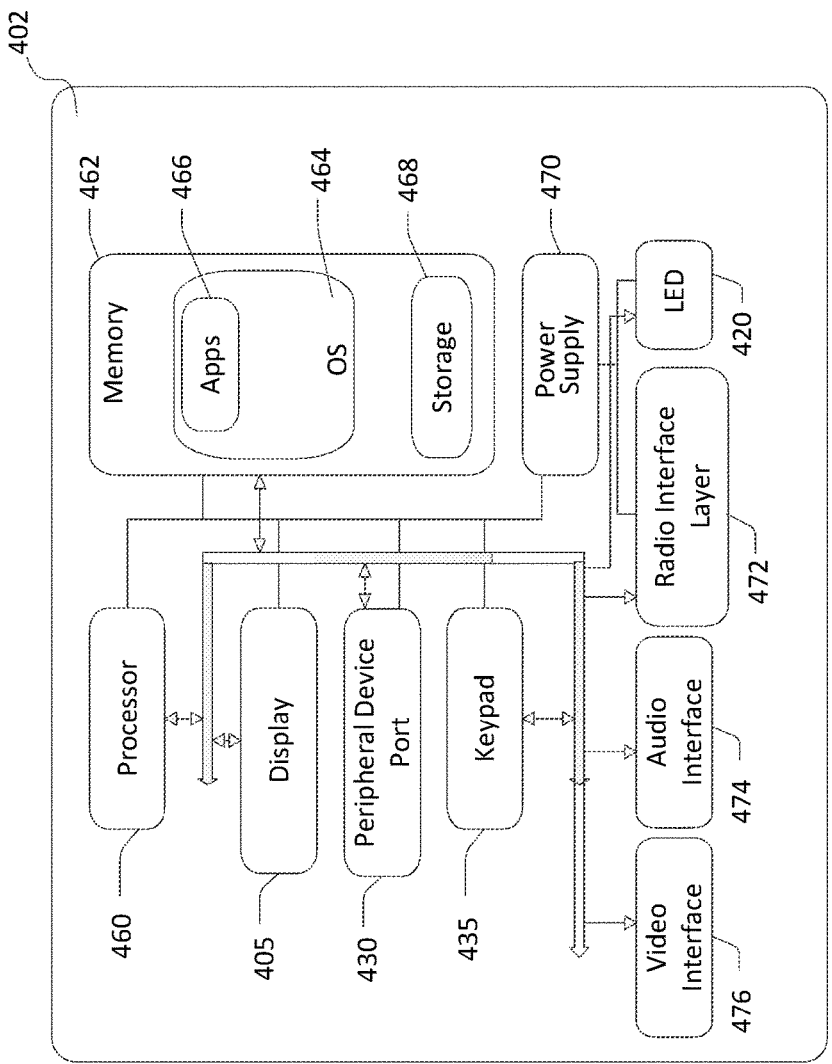
Figure 5:
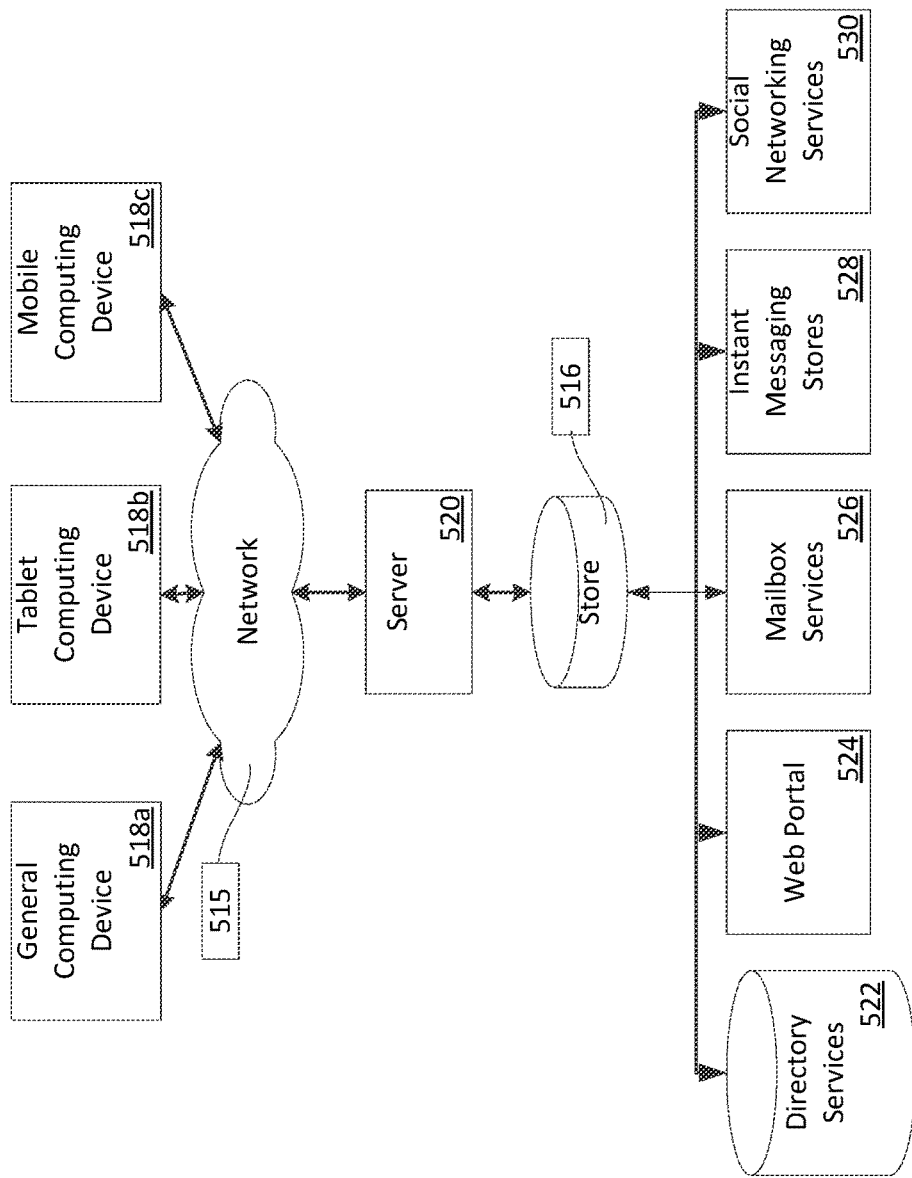
FIG. 5 is a simplified block diagram of a distributed computing system in which aspects of the present disclosure may be practiced.

FIGS. 3-5 and the associated descriptions provide a discussion of a variety of operating environments in which examples of the invention may be practiced. However, the devices and systems illustrated and discussed with respect to FIGS. 3-5 are for purposes of example and illustration and are not limiting of a vast number of computing device configurations that may be utilized for practicing examples of the invention, described herein.

FIG. 3 is a block diagram illustrating physical components of a computing device 302, for example a mobile processing device, with which examples of the present disclosure may be practiced. Among other examples, computing device 302 may be an exemplary computing device configured for management of help desk requests through an exemplary help desk service as described herein. In a basic configuration, the computing device 302 may include at least one processing unit 304 and a system memory 306. Depending on the configuration and type of computing device, the system memory 306 may comprise, but is not limited to, volatile storage (e.g., random access memory), non-volatile storage (e.g., read-only memory), flash memory, or any combination of such memories. The system memory 306 may include an operating system 307 and one or more program modules 308 suitable for running software programs/modules 320 such as IO manager 324, other utility 326 and application 328. As examples, system memory 306 may store instructions for execution. Other examples of system memory 306 may store data associated with applications. The operating system 307, for example, may be suitable for controlling the operation of the computing device 302. Furthermore, examples of the invention may be practiced in conjunction with a graphics library, other operating systems, or any other application program and is not limited to any particular application or system. This basic configuration is illustrated in FIG. 3 by those components within a dashed line 322. The computing device 302 may have additional features or functionality. For example, the computing device 302 may also include additional data storage devices (removable and/or non-removable) such as, for example, magnetic disks, optical disks, or tape. Such additional storage is illustrated in FIG. 3 by a removable storage device 409 and a non-removable storage device 310.

As stated above, a number of program modules and data files may be stored in the system memory 306. While executing on the processing unit 404, program modules 408 (e.g., Input/Output (I/O) manager 324, other utility 326 and application 328) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 402 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 302 may also have one or more input device(s) 312 such as a keyboard, a mouse, a pen, a sound input device, a device for voice input/recognition, a touch input device, etc. The output device(s) 314 such as a display, speakers, a printer, etc. may also be included. The aforementioned devices are examples and others may be used. The computing device 404 may include one or more communication connections 316 allowing communications with other computing devices 318. Examples of suitable communication connections 316 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 306, the removable storage device 309, and the non-removable storage device 310 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 302. Any such computer storage media may be part of the computing device 302. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 4A and 4B illustrate a mobile computing device 400, for example, a mobile telephone, a smart phone, a personal data assistant, a tablet personal computer, a phablet, a slate, a laptop computer, and the like, with which examples of the invention may be practiced. Mobile computing device 400 may be an exemplary computing device configured for management of help desk requests through an exemplary help desk service as described herein. Application command control may be provided for applications executing on a computing device such as mobile computing device 400. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 4A, one example of a mobile computing device 400 for implementing the examples is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. The display 405 of the mobile computing device 400 may also function as an input device (e.g., touch screen display). If included, an optional side input element 415 allows further user input. The side input element 415 may be a rotary switch, a button, or any other type of manual input element. In alternative examples, mobile computing device 400 may incorporate more or less input elements. For example, the display 405 may not be a touch screen in some examples. In yet another alternative example, the mobile computing device 400 is a portable phone system, such as a cellular phone. The mobile computing device 400 may also include an optional keypad 435. Optional keypad 435 may be a physical keypad or a "soft" keypad generated on the touch screen display or any other soft input panel (SIP). In various examples, the output elements include the display 405 for showing a GUI, a visual indicator 420 (e.g., a light emitting diode), and/or an audio transducer 425 (e.g., a speaker). In some examples, the mobile computing device 400 incorporates a vibration transducer for providing the user with tactile feedback. In yet another example, the mobile computing device 400 incorporates input and/or output ports, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one example of a mobile computing device. That is, the mobile computing device 400 can incorporate a system (i.e., an architecture) 402 to implement some examples. In one examples, the system 402 is implemented as a "smart phone" capable of running one or more applications (e.g., browser, e-mail, calendaring, contact managers, messaging clients, games, and media clients/players). In some examples, the system 402 is integrated as a computing device, such as an integrated personal digital assistant (PDA), tablet and wireless phone.

One or more application programs 466 may be loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device (e.g. system 402) described herein.

The system 402 has a power supply 470, which may be implemented as one or more batteries. The power supply 470 might further include an external power source, such as an AC adapter or a powered docking cradle that supplements or recharges the batteries.

The system 402 may include peripheral device port 430 that performs the function of facilitating connectivity between system 402 and one or more peripheral devices. Transmissions to and from the peripheral device port 430 are conducted under control of the operating system (OS) 464. In other words, communications received by the peripheral device port 430 may be disseminated to the application programs 466 via the operating system 464, and vice versa.

The system 402 may also include a radio interface layer 472 that performs the function of transmitting and receiving radio frequency communications. The radio interface layer 472 facilitates wireless connectivity between the system 402 and the "outside world," via a communications carrier or service provider. Transmissions to and from the radio interface layer 472 are conducted under control of the operating system 464. In other words, communications received by the radio interface layer 472 may be disseminated to the application programs 566 via the operating system 464, and vice versa.

The visual indicator 420 may be used to provide visual notifications, and/or an audio interface 474 may be used for producing audible notifications via the audio transducer 425 (as described in the description of mobile computing device 400). In the illustrated example, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425 (shown in FIG. 4A), the audio interface 474 may also be coupled to a microphone to receive audible input, such as to facilitate a telephone conversation. In accordance with examples of the present invention, the microphone may also serve as an audio sensor to facilitate control of notifications, as will be described below. The system 402 may further include a video interface 476 that enables an operation of an on-board camera 430 to record still images, video stream, and the like.

A mobile computing device 400 implementing the system 402 may have additional features or functionality. For example, the mobile computing device 400 may also include additional data storage devices (removable and/or non-removable) such as, magnetic disks, optical disks, or tape. Such additional storage is illustrated in FIG. 4B by the non-volatile storage area 468.

Data/information generated or captured by the mobile computing device 400 and stored via the system 402 may be stored locally on the mobile computing device 400, as described above, or the data may be stored on any number of storage media that may be accessed by the device via the radio 472 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio 472 or via a distributed computing network. Similarly, such data/information may be readily transferred between computing devices for storage and use according to well-known data/information transfer and storage means, including electronic mail and collaborative data/information sharing systems.

FIG. 5 illustrates one example of the architecture of a system for providing an application that reliably accesses target data on a storage system and handles communication failures to one or more client devices, as described above. The system of FIG. 5 may be an exemplary system configured for management of help desk requests through an exemplary help desk service as described herein. Target data accessed, interacted with, or edited in association with programming modules 308 and/or applications 320 and storage/memory (described in FIG. 3) may be stored in different communication channels or other storage types. For example, various documents may be stored using a directory service 522, a web portal 524, a mailbox service 526, an instant messaging store 528, or a social networking site 530, IO manager 324, other utility 326, application 328 and storage systems may use any of these types of systems or the like for enabling data utilization, as described herein. A server 520 may provide storage system for use by a client operating on general computing device 302 and mobile device(s) 400 through network 515. By way of example, network 515 may comprise the Internet or any other type of local or wide area network, and a client node may be implemented for connecting to network 515. Examples of a client node comprise but are not limited to: a computing device 302 embodied in a personal computer, a tablet computing device, and/or by a mobile computing device 400 (e.g., mobile processing device). As an example, a client node may connect to the network 515 using a wireless network connection (e.g. WiFi connection, Bluetooth, etc.). However, examples described herein may also extend to connecting to network 515 via a hardwire connection. Any of these examples of the client computing device 302 or 400 may obtain content from the store 516.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
    receiving, through a modality of a help desk service, a request for technical support from a customer of the help desk service, wherein the request comprises a voice communication from the customer;
    evaluating the request, wherein the evaluating comprises: analyzing an issue associated with the request and analyzing user-specific signal data associated with the customer, wherein the analyzing of the user-specific signal data comprises computer analysis of lexical and prosodic features of the voice communication;
    generating insights based on the analyzed issue and the analyzed user-specific signal data;
    matching a support agent of the help desk service to the customer based on an evaluation of the request, wherein the matching comprises selecting the support agent from a pool of support agents based on an application of a model that analyzes support agent data for the pool of support agents in correlation with the generated insights, wherein the support agent data comprises:
        customer performance reviews of support agents from the pool of support agents,
        organizational reviews of the support agents, wherein the organizational reviews comprise data evaluating previous interactions, through the help desk service, involving the support agents,
        agent self-evaluations that include a review of a technical expertise of the support agents and a review of communication skills of the support agents, and
        availability information for the support agents; and
    initiating, through the help desk service, an interaction between the matched support agent and the customer.

2. The method of claim 1, wherein an insight of the generated insights comprises identification of a technical expertise of the customer, and wherein the technical expertise of the matched support agent is at least that of the technical expertise of the customer.

3. The method of claim 2, wherein insights of the generated insights further comprise: two or more selected from a group consisting of: a frustration level of the customer, an indication of one or more recent poor customer experiences and a rating indicating likelihood that a user is a risk to leaving the help desk service.

4. The method of claim 1, wherein the organizational reviews of the support agents comprise peer reviews, from other support agents of the pool of support agents, that have the same technical expertise as the support agent.

5. The method of claim 1, wherein the matched support agent is a chat bot.

6. The method of claim 1, wherein the interaction between the matched support agent and the customer is an indication of an automatic resolution of the issue by the matched support agent.

7. The method of claim 1, wherein the interaction between the matched support agent and the customer comprises automatically patching the matched support agent into an ongoing call communication involving the customer and another support agent of the pool of support agents.

8. A system comprising:
    at least one processor; and
    a memory, operatively connected with the at least one processor, storing computer-executable instructions that, when executed by the at least one processor, causes the at least one processor to execute a method that comprises:
        receiving, through a modality of a help desk service, a request for technical support from a customer of the help desk service, wherein the request comprises a voice communication from the customer;
        evaluating the request, wherein the evaluating comprises: analyzing an issue associated with the request and analyzing user-specific signal data associated with the customer, wherein the analyzing of the user-specific signal data comprises computer analysis of lexical and prosodic features of the voice communication;
        generating insights based on the analyzed issue and the analyzed user-specific signal data;
        matching a support agent of the help desk service to the customer based on an evaluation of the request, wherein the matching comprises selecting the support agent from a pool of support agents based on an application of a model that analyzes support agent data for the pool of support agents in correlation with the generated insights, wherein the support agent data comprises:
            customer performance reviews of support agents from the pool of support agents,
            organizational reviews of the support agents, wherein the organizational reviews comprise data evaluating previous interactions, through the help desk service, involving the support agents, agent self-evaluations that include a review of a technical expertise of the support agents and a review of communication skills of the support agents, and availability information for the support agents; and initiating, through the help desk service, an interaction between the matched support agent and the customer.

9. The system of claim 8, wherein an insight of the generated insights comprises identification of a technical expertise of the customer, and wherein the technical expertise of the matched support agent is at least that of the technical expertise of the customer.

10. The system of claim 9, wherein insights of the generated insights further comprise two or more selected from a group consisting of: a frustration level of the customer, an indication of one or more recent poor customer experiences and a rating indicating likelihood that a user is a risk to leaving the help desk service.

11. The system of claim 8, wherein the organizational reviews of the support agents comprise peer reviews, from other support agents of the pool of support agents, that have the same technical expertise as the support agent.

12. The system of claim 8, wherein the matched support agent is a chat bot.

13. The system of claim 8, wherein the interaction between the matched support agent and the customer is an indication of an automatic resolution of the issue by the matched support agent.

14. The system of claim 8, wherein the interaction between the matched support agent and the customer comprises automatically patching the matched support agent into an ongoing call communication involving the customer and another support agent of the pool of support agents.

15. A computer storage media storing computer-executable instructions that, when executed by at least one processor, causes the at least one processor to execute a method comprising:

receiving, through a modality of a help desk service, a request for technical support from a customer of the help desk service, wherein the request comprises a voice communication from the customer;

evaluating the request, wherein the evaluating comprises: analyzing an issue associated with the request and analyzing user-specific signal data associated with the customer, wherein the analyzing of the user-specific signal data comprises computer analysis of lexical and prosodic features of the voice communication;

generating insights based on the analyzed issue and the analyzed user-specific signal data;

matching a support agent of the help desk service to the customer based on an evaluation of the request, wherein the matching comprises selecting the support agent from a pool of support agents based on an application of a model that analyzes support agent data for the pool of support agents in correlation with the generated insights, wherein the support agent data comprises:

customer performance reviews of support agents from the pool of support agents, organizational reviews of the support agents, wherein the organizational reviews comprise data evaluating previous interactions, through the help desk service, involving the support agents, agent self-evaluations that include a review of a technical expertise of the support agents and a review of communication skills of the support agents, and availability information for the support agents; and initiating, through the help desk service, an interaction between the matched support agent and the customer.

16. The computer storage media of claim 15, wherein an insight of the generated insights comprises identification of a technical expertise of the customer, and wherein the technical expertise of the matched support agent is at least that of the technical expertise of the customer.

17. The computer storage media of claim 16, wherein insights of the generated insights further comprise two or more selected from a group consisting of: a frustration level of the customer, an indication of one or more recent poor customer experiences and a rating indicating likelihood that a user is a risk to leaving the help desk service.

18. The computer storage media of claim 15, wherein the organizational reviews of the support agents comprise peer reviews, from other support agents of the pool of support agents, that have the same technical expertise as the support agent.

19. The computer storage media of claim 15, wherein the interaction between the matched support agent and the customer is an indication of an automatic resolution of the issue by the matched support agent.

20. The computer storage media of claim 15, wherein the interaction between the matched support agent and the customer comprises automatically patching the matched support agent into an ongoing call communication involving the customer and another support agent of the pool of support agents.

* * * * *